US011760344B2

(12) United States Patent
Morotomi et al.

(10) Patent No.: US 11,760,344 B2
(45) Date of Patent: Sep. 19, 2023

(54) COLLISION AVOIDANCE ASSIST APPARATUS (71) Applicant: TOYOTA JIDOSHA KABUSHIKI KAISHA, Toyota (JP)

(72) Inventors: Kohei Morotomi, Nagoya (JP); Yuto Shimbo, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 465 days.

(21) Appl. No.: 17/175,745

(22) Filed: Feb. 15, 2021

(65) Prior Publication Data
US 2021/0253093 A1 Aug. 19, 2021

(30) Foreign Application Priority Data

Feb. 17, 2020 (JP) .................................. 2020-23928

(51) Int. Cl.
*B60W 30/09* (2012.01)
*G08G 1/16* (2006.01)
(Continued)

(52) U.S. Cl.
CPC ............ *B60W 30/09* (2013.01); *B60W 10/20* (2013.01); *B60W 30/0956* (2013.01); *G08G 1/16* (2013.01); *B60W 10/18* (2013.01)

(58) Field of Classification Search
CPC .. B60W 30/09; B60W 10/20; B60W 30/0956; B60W 10/18; B60W 2554/4041;
(Continued)

(56) References Cited

U.S. PATENT DOCUMENTS

2017/0057498 A1  3/2017  Katoh
2021/0163021 A1* 6/2021  Frazzoli ................ B60W 50/02

FOREIGN PATENT DOCUMENTS

GB    2609783 A  *  2/2023  .......... B60W 30/095
JP    2017043262 A    3/2017

OTHER PUBLICATIONS

J. Choi, K. Kim and K. Yi, "Emergency driving support algorithm with steering torque overlay and differential braking," 2011 14th International IEEE Conference on Intelligent Transportation Systems (ITSC), Washington, DC, USA, 2011, pp. 1433-1439, doi: 10.1109/ITSC.2011.6083120. (Year: 2011).*

* cited by examiner

*Primary Examiner* — Russell Frejd
*Assistant Examiner* — Ana D Thomas
(74) *Attorney, Agent, or Firm* — Dickinson Wright, PLLC (57) ABSTRACT

Collision avoidance assist apparatus comprises an object information acquiring apparatus for acquiring, as object information, information on a three-dimensional object as well as dividing lines defining a travelling lane in front of a vehicle, and a control unit configured to, when a collision possibility with a three-dimensional object is high, identify this object as a target object. When one of the dividing lines has been detected without any discontinuation in a predetermined region as well as a part of an other dividing line has not been detected therein, if the control unit determines, based on the object information, that a second condition which is satisfied when the target object is positioned on the other dividing line and is moving in a same direction as an extending direction is satisfied and an avoidance route exists, the control unit performs automatic steering control so that the vehicle travels along the avoidance route.

3 Claims, 6 Drawing Sheets

(51) Int. Cl.
*B60W 10/20* (2006.01)
*B60W 30/095* (2012.01)
*B60W 10/18* (2012.01)

(58) Field of Classification Search
CPC ... B60W 2554/4042; B60W 2554/806; B60W 2552/53; B60W 2554/00; B60W 2554/4044; B60W 2554/4023; B60W 2554/4026; B60W 2554/4029; G08G 1/16; G08G 1/166
See application file for complete search history.

COLLISION AVOIDANCE ASSIST APPARATUS

TECHNICAL FIELD

The present invention relates to a collision avoidance assist apparatus feasible of collision avoidance assist control for avoiding a collision with a three-dimensional object.

BACKGROUND ART

A collision avoidance assist apparatus (hereinafter, referred to as a "conventional apparatus") has been conventionally known, the conventional apparatus being feasible of automatic steering control as collision avoidance assist control for avoiding a collision with a three-dimensional object.

The automatic steering control is control for, when a three-dimensional object with a high possibility of colliding with an own vehicle (Hereinafter, such a three-dimensional object will be also referred to as a "target object".) has been detected in front of the own vehicle by means of sensors such as a camera and/or a radar etc., automatically changing a steered angle of steered wheels of the own vehicle so as to avoid a collision with the target object without deviating from a travelling lane (a lane on which the own vehicle is currently travelling) (for example, refer to Japanese Patent Application Laid-Open (kokai) No. 2017-043262.

SUMMARY OF THE INVENTION

For more detail, when the target object has been detected, the conventional apparatus determines whether or not a following space exists in front of the own vehicle where the own vehicle can avoid a collision with this target object without deviating from the travelling lane, and when having determined that such a space exists, performs the automatic steering control. Hereinafter, this space will be referred to as an "avoidance space".

An avoidance space is a space inside/on the travelling lane. The travelling lane is a region between left and right dividing lines. Therefore, when determining whether or not an avoidance space exists, the conventional apparatus first determines whether or not the left and right dividing lines forming the travelling lane have been detected as continuous lines in front of the own vehicle (in other words, determines whether or not the left and right "continuous" dividing lines forming the travelling lane have been detected in front of the own vehicle). When a part where at least one of the dividing lines has not been detected extends more than or equal to a predetermined distance, the conventional apparatus determines that there is a possibility that the travelling lane does not exist/extend in a continuous manner in front of the own vehicle (specifically, there is a possibility that there is some dent on a road, a cliff, or the like in this interval/section), and determines that any avoidance space does not exist (That is, the conventional apparatus does not perform the automatic steering control.). It should be noted that when having determined that any avoidance space does not exist, the conventional apparatus performs other controls for avoiding or mitigating a collision with a target object (for example, automatic braking control/autonomous emergency braking control for automatically applying a braking force on the own vehicle).

According to the conventional apparatus, there may arise a situation where the automatic steering control is not performed in spite of being feasible. That is, when a target object is positioned on one of the dividing lines of the travelling lane for example, there may be a case where it is determined that any avoidance space does not exist because a dividing line farther from the own vehicle is not detected. In this case, even though an avoidance space actually exists and the automatic steering control is feasible, the automatic steering control will not be performed. Such a situation is likely to occur under a following situation for example, that is, a situation where a following pedestrian has been detected as a target object when the pedestrian who had been walking on a roadside zone (pedestrian walkway) deviates to a roadway side for some reason and is walking on a dividing line on a roadside zone side of the travelling lane.

The present invention is made to resolve the problem above. That is, one of objects of the present invention is to provide a collision avoidance assist apparatus capable of properly performing automatic steering control.

A collision avoidance assist apparatus (hereinafter, referred to as a "present invention apparatus") according to the present invention comprises:

an object information acquiring apparatus (11) for acquiring, as object information, information on a three-dimensional object (40) existing in front of an own vehicle as well as left and right dividing lines (LL, LR) defining a travelling lane extending in front of the own vehicle;

a steered angle actuator (22, 23) configured to be capable of changing a steered angle of the own vehicle; and a control unit (10) configured to acquire, based on the object information, a collision index value indicating a collision possibility of the own vehicle and the three-dimensional object (40), and when the collision index value satisfies a collision condition (step 415: Yes, step 417) which is satisfied when the collision possibility is high, to identify the three-dimensional object (40) as a target object, wherein, the control unit (10) is configured to:

determine (step 505), based on the object information, whether or not a first condition is satisfied, the first condition being satisfied when both of the left and right dividing lines (LL, LR) of the travelling lane have been detected without any discontinuation in a predetermined region (R) in front of the own vehicle, when it is determined that the first condition is not satisfied (step 505: No) and one dividing line of the left and right dividing lines (LL, LR) has been detected without any discontinuation in the predetermined region (R) as well as a part of an other dividing line has not been detected in the predetermined region (R) (step 535: Yes), determine, based on the object information, whether or not a second condition is satisfied (steps 540, 545, 550), the second condition being satisfied when the target object (40) is positioned on the other dividing line as well as the target object (40) is moving in a direction same as an extending direction of the one dividing line, determine (steps 520, 525), based on the object information, whether or not an avoidance route (Rtgt) for the own vehicle exists, the avoidance route (Rtgt) enabling the own vehicle to avoid a collision with the target object (40) without the own vehicle deviating from the travelling lane, determine whether or not a steering avoidance condition is satisfied, the steering avoidance condition including a condition that either the first condition or the second condition is satisfied as well as the avoidance route exists, and when it is determined that the steering avoidance condition is satisfied (step 525: No), perform automatic steering control (step 440) for controlling the steered angle actuator (22, 23) in such a manner that the own vehicle travels along the avoidance route (Rtgt).

In the present invention apparatus, even though it is determined that one dividing line of the left and right dividing lines has been detected without any discontinuation in the above-mentioned predetermined region as well as a part of an other dividing line has not been detected in the predetermined region, when it is determined that the "steering avoidance condition including a condition where the second condition (a condition which is satisfied when the target object is positioned on the other dividing line as well as the target object is moving in the same direction as the extending direction of the one dividing line) is satisfied as well as an avoidance route exists" is satisfied, the automatic steering control is performed. That is, in the present invention apparatus, when the second condition is satisfied, it is determined that on a farther side of the target object when seen from the own vehicle, the other dividing line forming a part with the one dividing line should be extending, and it is determined that the travelling lane continuously exists in front of the own vehicle. Therefore, even when either one of the left and right dividing lines has not been partially detected, by determining whether or not the second condition is satisfied, it becomes possible to properly determine whether or not the travelling lane continuously exists in front of the own vehicle. Accordingly, a situation where the automatic steering control is not performed in spite of the control being actually feasible becomes less likely to occur. Therefore, the automatic steering control can be properly performed.

In another aspect of the present invention, the control unit (10) is configured to, when a magnitude (|θ|) of an angle (θ) is less than or equal to a predetermined angle threshold (θth), the angle being formed by a moving direction (d1) of the target object (40) and the extending direction (d2) of the one dividing line, determine that the target object (40) is moving in a same direction as the extending direction (d2) of the one dividing line.

According to one aspect of the present invention, it becomes possible to properly determine whether or not the moving direction of the target object is the same as the extending direction of the one dividing line.

In another aspect of the present invention, the control unit (10) is configured to, when a distance of a part where the dividing line has not been detected is more than or equal to a predetermined distance threshold (dth), determine that the part of the dividing line has not been detected.

According to one aspect of the present invention, when the distance of a part where the dividing line has not been detected is less than the distance threshold, it is determined that the dividing line has been detected without any discontinuation (that is, as a continuous line) even in this part. Therefore, by setting the distance threshold to a proper value, it is more likely to be determined that both of the left and right dividing lines have been detected without any discontinuation. Hence, it becomes possible to perform the automatic steering control even under a situation where the control used not to be performed because a dividing line has not partially detected. As a result, a possibility that the automatic steering control is not performed in spite of being feasible can be further reduced.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1:
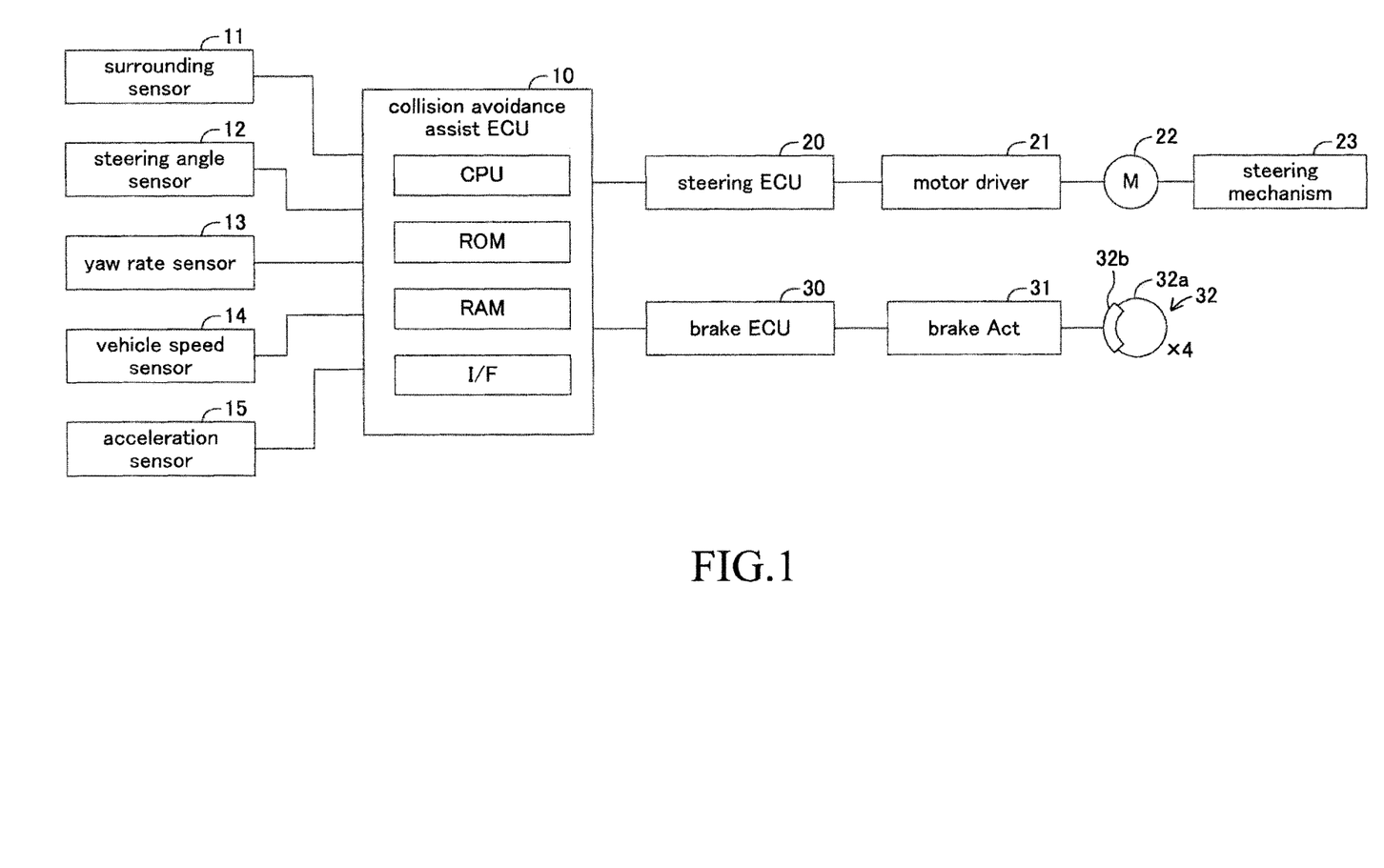
FIG. 1 is a schematic configuration diagram of a collision avoidance assist apparatus according to an embodiment of the present invention.

A collision avoidance assist apparatus according to an embodiment of the present invention (hereinafter, may be also referred to as a "present embodiment apparatus") will be described below, referring to figures. As shown in FIG. 1, the present embodiment apparatus comprises collision avoidance assist ECU 10, steering ECU 20, and brake ECU 30. Each of the ECUs 10, 20, and 30 comprises a microcomputer as a main component and is connected to each other in such a manner that they can mutually exchange data (communicate) via a non-illustrated CAN (Controller Area Network). It should be noted that ECU is an abbreviation of Electronic Control Unit. The microcomputer includes CPU, ROM, RAM, interfaces, and the like. The CPU realizes (performs) various functions by executing instructions (i.e. programs, routines) stored in the ROM. Some of or all of the ECUs 10, 20, and 30 may be integrated to one ECU as a controller. Hereinafter, a vehicle to which the present embodiment apparatus is applied may be referred to as an "own vehicle".

The collision avoidance assist ECU 10 is connected to a surrounding sensor 11, a steering angle sensor 12, a yaw rate sensor 13, a vehicle speed sensor 14, and an acceleration sensor 15, and is configured to receive an output signal and a detection signal from each of these sensors every time a predetermined interval elapses. Hereinafter, the collision avoidance assist ECU may be also simply referred to as "ECU 10".

The surrounding sensor 11 (an object information acquiring apparatus) has function for acquiring information at least on "a three-dimensional object(s) present in front of the own vehicle and a dividing line(s) extending in front of the own vehicle". The three-dimensional object includes a moving object (a vehicle, a pedestrian, a bicycle, and the like) and a fixed object (a guardrail, a sidewall, a medial divider, a street tree, and the like). It should be noted that the "moving object" means an object capable of moving but does not mean that it is always moving.

The surrounding sensor 11 comprises a radar sensor and a camera sensor. The radar sensor emits an electric wave in a millimeter waveband to a surrounding of the own vehicle (including at least a front region thereof), and when a three-dimensional object exists, receives a reflected wave from this three-dimensional object. The surrounding sensor 11 calculates, based on an emitting timing and a receiving timing of the electric wave, and the like, whether or not a three-dimensional object exists, types of the three-dimensional object, and a relative relationship between the own vehicle and the three-dimensional object. The relative relationship between the own vehicle and the three-dimensional object includes a distance from the own vehicle to the three-dimensional object, a direction of the three-dimensional object with respect to the own vehicle, a relative speed of the three-dimensional object with respect to the own vehicle, and the like. The types of the three-dimensional object can be identified based on intensity of the reflected wave of the radar sensor. Specifically, the intensity of the reflected wave of the radar sensor varies depending on material of the three-dimensional object. For example, when the three-dimensional object is made mainly of metal, the intensity of the reflected wave is relatively high, and when the three-dimensional object is made mainly of non-metal, the intensity of the reflected wave is relatively low. The radar sensor estimates material of the three-dimensional object based on the intensity of the reflected wave, and identifies, based on the estimated material, the types of the three-dimensional object.

The camera sensor comprises a stereo camera. The camera sensor takes an image of scenery of a left side region and a right side region in front of the own vehicle, and recognizes a road marking(s) based on left and right image data captured. The road markings include dividing lines. The dividing lines are lines marked on a road for dividing passing directions of each vehicle. The dividing line includes a solid dividing line and a dashed dividing line. The solid diving line is a dividing line marked in a continuous manner/as a continuous line on a road, and includes a white dividing line and a yellow dividing line. The dashed dividing line is a dividing line marked in an intermittent manner on a road at a predetermined interval d (d=5 m, for example), and includes a white dividing line. The present embodiment apparatus defines a region between two adjacent dividing lines extending on a roadway as a lane. The camera sensor calculates, based on the dividing lines recognized, a shape of a lane (includes a curvature thereof). In addition, the camera sensor calculates, based on the above-mentioned image data, whether or not a three-dimensional object exists, types of the three-dimensional object, and a relative relationship between the own vehicle and the three-dimensional object. The types of a three-dimensional object can be identified using a well-known pattern matching by analyzing the image data.

That is, the surrounding sensor 11 detects a three-dimensional object(s) present in front of the own vehicle and a dividing line(s) extending in front of the own vehicle (in more detail, left and right dividing lines defining a travelling lane extending in front of the own vehicle). It should be noted that a term "left and right" means a left side and a right side with respect to a travelling direction of the own vehicle on the travelling lane.

The information acquired by the surrounding sensor 11 may be referred to as object information. The surrounding sensor 11 transmits the object information to the ECU 10. The ECU 10 fusions the information calculated by the radar sensor and the information calculated by the camera sensor to acquire the final object information.

It should be noted that the surrounding sensor 11 does not necessarily have to comprise both of the radar sensor and the camera sensor. For example, the surrounding sensor 11 may comprise only the camera sensor. Further, the camera sensor may be a monocular (single-lens) camera. Alternately, the surrounding sensor 11 may comprise a laser radar sensor in addition to or in place of the radar sensor. Further, the information on a shape of a road may be acquired by means of navigation system (illustration omitted).

The steering angle sensor 12 detects a steering angle of a steering wheel of the own vehicle and transmits a detection signal to the ECU 10. The yaw rate sensor 13 detects a yaw rate of the own vehicle and transmits a detection signal to the ECU 10. The vehicle speed sensor 14 detects a travelling speed of the own vehicle (hereinafter, referred to as a "vehicle speed") and transmits a detection signal to the ECU 10. The acceleration sensor 15 detects a front-rear acceleration which is an acceleration acting in a front-rear direction of the own vehicle as well as a lateral acceleration which is an acceleration acting in a left-right direction of the own vehicle (a vehicle width direction), and transmits those detection signals to the ECU 10.

The steering ECU 20 is a control apparatus of a well-known electrically-driven power steering system and is connected to a motor driver 21. The motor driver 21 is connected to a steered motor 22. The steered motor 22 is incorporated into a steering mechanism 23. The steering mechanism 23 is a rack and pinion mechanism, for example. The steered motor 22 generates torque with electric power supplied from the motor driver 21 and by applying the torque to the steering mechanism 23, can generate steering assist torque or can turn left-and-right steered wheels. That is, the steered motor 22 and the steering mechanism 23 function as a steered angle actuator for changing a steered angle of the own vehicle.

Specifically, the steering ECU 20 drives the steered motor 22 based on steering torque detected by steering operation (operation of the steering wheel) by a driver, and thereby applies the steering assist torque to the steering mechanism to assist the driver in the steering operation.

In addition, the ECU 10 is configured to be capable of transmitting a steering instruction (described later) to the steering ECU 20. When receiving the steering instruction, the steering ECU 20 drives (controls) the steered motor 22 in response to this instruction. Accordingly, the ECU 10 can automatically change the steered angle of the steered wheel via the steering ECU 20.

The brake ECU 30 is connected to a brake actuator 31. The brake actuator 31 is provided in a hydraulic circuit between a non-illustrated master cylinder to compress operating fluid with a pedaling force of a brake pedal and a friction brake mechanism 32 provided at each wheel. Each of the friction brake mechanisms 32 comprises a brake disc 32a fixed to the wheel and a brake caliper 32b fixed to a vehicle body. Each of the friction brake mechanisms 32 operates a wheel cylinder which is built in the brake caliper 32b by a hydraulic pressure of the operating fluid that is supplied from the brake actuator 31, and thereby presses a brake pad onto the brake disc 32a to generate friction braking force.

The ECU 10 is configured to be capable of transmitting a braking instruction (described later) to the brake ECU 30. When receiving the braking instruction, the brake ECU 30 drives (controls) the brake actuator 31 in response to this instruction. Accordingly, the ECU 10 can automatically apply the braking force to the own vehicle via the brake ECU 30.

Next, a description regarding the ECU 10 will be made. The present embodiment apparatus is configured to be capable of performing automatic steering control and automatic braking control/autonomous emergency braking as collision avoidance assist control for avoiding a collision with a three-dimensional object.

First, processing of the ECU 10 concerning the automatic steering control will be described. The automatic steering control is control for, when a three-dimensional object with a high possibility of colliding with the own vehicle (that is, a target object) has been detected inside a travelling lane in front of the own vehicle, automatically changing a steered angle of steered wheels of the own vehicle so as to avoid a collision with the target object without deviating from a travelling lane.

The ECU 10 determines, based on the object information, whether or not a three-dimensional object(s) exists in front of the own vehicle. When having determined that a three-dimensional object(s) exists, the ECU 10 generates information on all the three-dimensional objects determined to exist. Specifically, the ECU 10 sets an origin at a central position of a front edge of the own vehicle, and generates coordinate information of the three-dimensional objects where a positional coordinate of each thereof is included, using a coordinate system expanding in the left-right direction and in a front direction from the origin.

Subsequently, the ECU 10 determines, for each of all the three-dimensional objects, whether or not a possibility (hereinafter, also referred to as a "collision possibility") that the own vehicle collides with the three-dimensional object is high. To be more specific, the ECU 10 calculates a turning radius of the own vehicle based on a yaw rate detected by the yaw rate sensor 13 and a vehicle speed detected by the vehicle speed sensor 14, and calculates a trajectory of the own vehicle based on this turning radius. In addition, the ECU 10 calculates a trajectory of each three-dimensional object based on the coordinate information of each three-dimensional object. The ECU 10 determines, based on the trajectory of the own vehicle and the trajectory of each three-dimensional object, whether or not the own vehicle will collide with either one of the three-dimensional objects assuming that the own vehicle keeps travelling under a current travelling state as well as each three-dimensional object keeps moving under a current moving state. It should be noted that when a three-dimensional object is stationary, the ECU 10 conducts this determination processing based on the trajectory of the own vehicle and a current position of the three-dimensional object.

When the ECU 10 determines that the own vehicle will collide with the three-dimensional object by the above-mentioned determination processing, the ECU 10 calculates a time to collision (hereinafter, may be also simply referred to as a "TTC") in accordance with a following expression (1) based on a distance L from the own vehicle to a collision expected position and a vehicle speed V, where TTC is an expected time (a remaining time to a collision) for the own vehicle to collide with a three-dimensional object.

$$TTC=L/V \qquad (1)$$

When the TTC is less than or equal to a predetermined collision determination threshold (hereinafter, also simply referred to as "TTCth"), the ECU 10 determines that the collision possibility is high. That is, the ECU 10 determines that this three-dimensional object is a target object. It should be noted that when more than one three-dimensional object are determined to have high collision possibilities, the ECU 10 chooses a three-dimensional object with the smallest TTC and determines that this three-dimensional object chosen is a target object. TTC is a collision index value showing a possibility of the own vehicle colliding with a three-dimensional object. It can be said that a case where TTC is less than or equal to the TTCth is a case where the collision index value (TTC) and the collision determination threshold (TTCth) satisfy a predetermined collision condition.

The TTCth is a variable varying depending on types of a three-dimensional object and a lap ratio. Here, the lap ratio is a value calculated by dividing a "length of the own vehicle overlapping with a three-dimensional object in a vehicle width direction thereof, assuming that the own vehicle collides with this three-dimensional object" by a "vehicle width of the own vehicle". The lap ratio can be calculated based on the types of a three-dimensional object included in the object information, the trajectory of the own vehicle, and the trajectory of the three-dimensional object (or the position thereof). On the other hand, TTCths have been calculated in advance, based on an experiment or a simulation, for each type of a three-dimensional object as well as a lap ratio, and these TTCths have been stored in the ROM of the ECU 10, being associated with a corresponding type of a three-dimensional object and a corresponding lap ratio. The ECU 10 calculates a TTC for a three-dimensional object, calculates a lap ratio with this three-dimensional object, and selects a TTCth from the ROM corresponding to the type of this three-dimensional object and the lap ratio. When TTC≤TTCth is satisfied, the ECU 10 determines that this three-dimensional object is a target object (in other words, detects a target object).

When the target object has been detected, the ECU 10 executes avoidance space determination processing for determining whether or not an avoidance space exists in front of the own vehicle. An avoidance space is a space enabling the own vehicle to avoid a collision with a target object present inside a travelling lane without deviating from the travelling lane. Therefore, an avoidance space includes an "avoidance route along which the own vehicle can avoid the collision with the target object present inside the travelling lane without deviating from the travelling lane". That is, existence of an avoidance space has the same meaning as existence of the avoidance route. It should be noted that "a target object exists inside a travelling lane" means that at least a part of the target object is positioned inside the travelling lane.

In the avoidance space determination processing, the ECU 10 determines whether or not following four conditions are all satisfied.

(Condition 1) Both of left and right dividing lines are detected as continuous lines (that is, without any discontinuation/break) over a predetermined distance range R.

(Condition 2) At least a part of a target object exists inside a travelling lane.

(Condition 3) It is possible for the own vehicle to pass through between the target object and one of the left and right dividing lines.

(Condition 4) Any other three-dimensional object does not exist inside the travelling lane around the target object.

When having determined that the above four conditions are all satisfied, the ECU 10 determines that an avoidance space exists.

Figure 2:
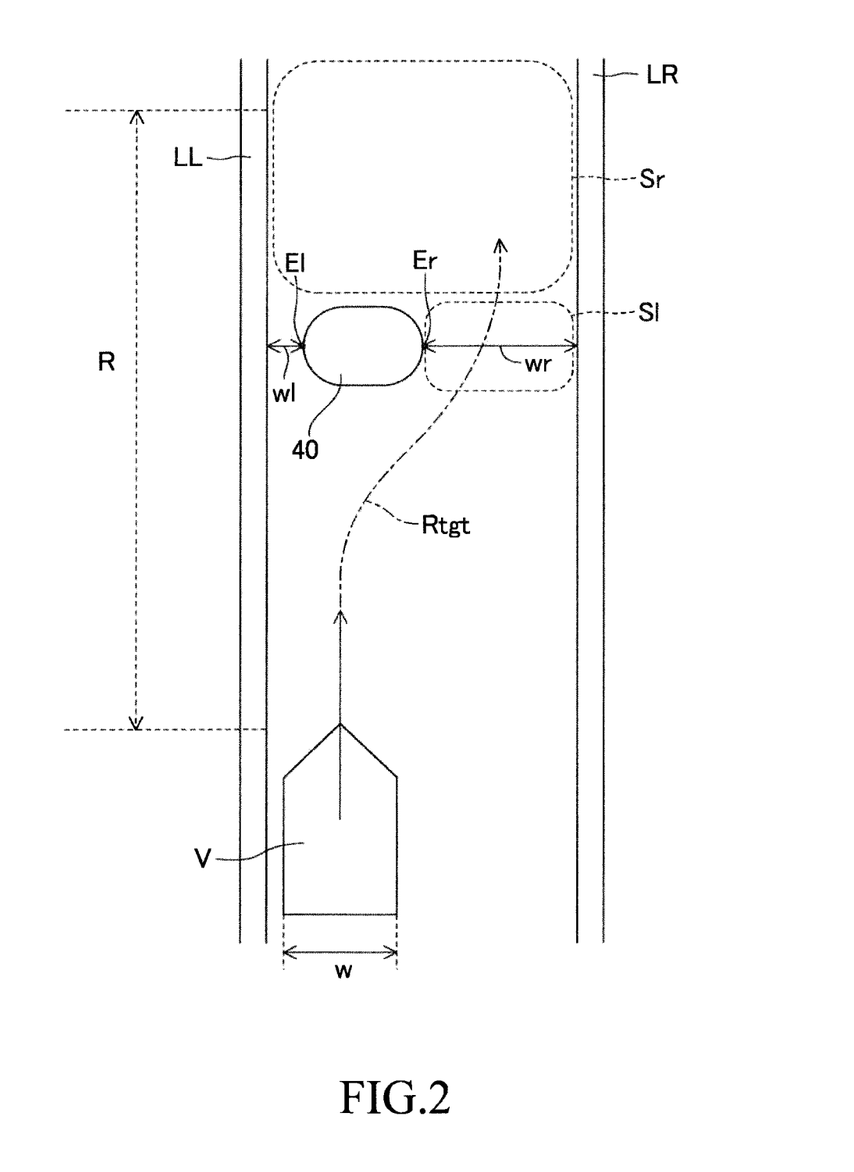
FIG. 2 is a diagram for describing on first determination processing among avoidance space determination processing.

A specific description regarding the conditions 1 to 4 will be made below. The ECU 10 determines whether or not the condition 1 is satisfied based on the object information. Specifically, when having determined that even a part of the left and right dividing lines defining the travelling lane extending in front of the own vehicle, the ECU 10 generates information regarding the dividing lines (that is, coordinate information of the dividing lines detected) using the coordinate system mentioned above. At this time, if the dividing lines are curved, the ECU 10 executes, based on a lane shape, a coordinate conversion of these dividing lines to straight dividing lines. Thereafter, the ECU 10 calculates, based on the coordinate information of the dividing lines, a distance from the own vehicle to each of the dividing lines as well as a length of each of the dividing lines. As shown in FIG. 2, when the dividing lines detected (dividing lines LL and LR in an example of FIG. 2) are extending without any discontinuation over a distance range R in front of the own vehicle (a region where a distance from the own vehicle is more than or equal to 0 and less than or equal to R1), the ECU 10 determines that the condition 1 is satisfied. It should be noted that the distance range R has been defined in advance by an experiment or a simulation based on a property of the surrounding sensor 11.

However, even though a dividing line detected within the distance range R breaks in the middle, if an interval db between breaking dividing lines is less than a predetermined distance threshold dth, the ECU 10 interpolates a braking part to determine that the condition 1 is satisfied. The distance threshold dth has been set to a value slightly larger than a general interval d of a dashed dividing line (dth>d). Thus, even though a type of a dividing line is a dashed dividing line, the ECU 10 determines that the condition 1 is satisfied as long as this dashed dividing line is extending over the distance range R.

In addition, when a dividing line has been detected to a position P1 apart from the own vehicle by a distance L1 (<R1) but has not been detected on a farther side from the position P1, if a distance R1-L1 of a section/interval where the dividing line has not been detected is less than the distance threshold dth, the ECU 10 extrapolates this undetected section to determine that the condition 1 is satisfied.

On the other hand, when the interval db or the distance R1-L1 is more than or equal to the distance threshold dth, the ECU 10 determines that the dividing line has not been detected as a continuous line (a part of the dividing line has not been detected). That is, the ECU 10 determines that the condition 1 is not satisfied.

When having determined that the condition 1 is satisfied, the ECU 10 determines whether or not the condition 2 is satisfied based on the coordinate information of a three-dimensional object(s) and the coordinate information of the dividing lines. Specifically, the ECU 10 determines that the condition 2 is satisfied when, as shown in FIG. 2, "at least a part of a group of coordinates included in an area from the left edge El to the right edge Er of the target object 40" is included in a group of coordinates indicating a region of the travelling lane.

When having determined that the condition 2 is satisfied, the ECU 10 determines whether or not the condition 3 is satisfied based on the coordinate information of a three-dimensional object(s) and the coordinate information of the dividing lines. Specifically, as shown in FIG. 2, the ECU 10 calculates a left side distance wl which is a lateral distance (a distance in a lane width direction) from a left edge El of a target object 40 to the dividing line LL. Similarly, the ECU 10 calculates a right side distance wr which is a lateral distance (a distance in a lane width direction) from a right edge Er of the target object 40 to the dividing line LR. It should be noted that the lane width direction is a direction perpendicular to the dividing lines LL and LR. The ECU 10 compares the left side distance wl and the right side distance wr, and determines whether or not a lateral distance ws having a larger value (the right side distance wr in the example of FIG. 2) is larger than a value w+m obtained by adding a predetermined margin m to the vehicle width w of the own vehicle V. Here, the margin m is a value which has been defined in advance as a length of a distance which should be secured between a target object and the own vehicle when the own vehicle passing through a side of the target object. When having determined that the above-mentioned lateral distance ws is larger than the value w+m, the ECU 10 determines that the condition 3 is satisfied.

When having determined that the condition 3 is satisfied, the ECU 10 determines whether or not the condition 4 is satisfied based on the coordinate information of the three-dimensional object and the coordinate information of the dividing lines. Specifically, as shown in FIG. 2, the ECU 10 determines whether or not an other three-dimensional object (a three-dimensional object which may interfere with travelling of the own vehicle) other than the target object 40 exists in a space Sl on a lateral side (the right side in the example of FIG. 2) of the target object 40 and a space Sr on a farther side of the target object 40.

The space Sl is a space positioned "on a side with a larger value among the left side distance wl and the right side distance wr (on the right side in the example of FIG. 2)" with respect to the target object 40. A length of the space Sl in the lane width direction (hereinafter, also referred to as a "lateral width") is substantially equal to the lateral distance ws (the right side distance wr in the example of FIG. 2)". A length of the space Sl in an extending direction of the dividing lines LL and LR (hereinafter, also referred to as a "depth") has been set in advance. It should be noted that the depth of the space Sl may vary depending on the types of a three-dimensional object.

The space Sr is a space inside the travelling lane positioned on the farther side of the target object 40 when seen from the own vehicle V. A lateral width of the space Sr is substantially equal to the lane width. A depth of the space Sr has been set in advance.

When having determined that any other three-dimensional objects do not exist in the space Sl and the space Sr, the ECU 10 determines that the condition 4 is satisfied.

The conventional apparatus determines that an avoidance space exists when the conditions 1 to 4 are all satisfied and that an avoidance space does not exist when at least one of these conditions is not satisfied. According to this determination processing, as will be subsequently described referring to FIG. 6, there may arise a situation where the automatic steering control is not performed in spite of actually being feasible.

Figure 6:
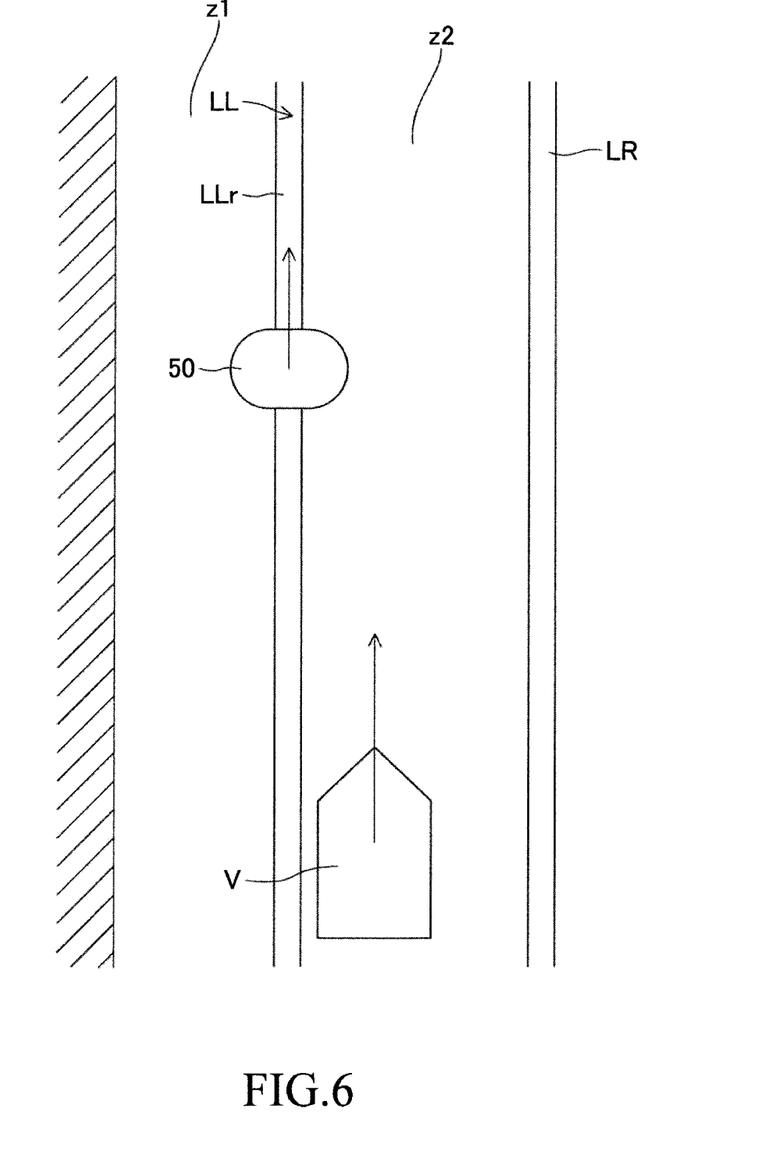
FIG. 6 is a diagram for describing on a problem of avoidance space determination processing executed by a conventional apparatus.

Z1 in FIG. 6 shows a roadside zone (pedestrian walkway). The roadside zone is a belt-like road portion provided on a road without a sidewalk/pavement. The roadside zone is a zone for a pedestrian, and is defined by a road marking (the dividing line LL in an example of FIG. 6). On one side of the roadside zone where the road marking is not provided (i.e., a left side), street trees, a side ditch/street drain, or the like are provided, and thereby the roadside zone is defined. Some roadside zone allows a bicycle to pass by. Z2 in FIG. 6 shows a travelling lane. The travelling lane z2 is a region between the left and right dividing lines LL and LR. That is, the dividing line LL is a road marking for defining the roadside zone z1 as well as a road marking for defining the travelling lane z2.

FIG. 6 shows a situation where a following three-dimensional object 50 that is a pedestrian has been detected as a target object when the three-dimensional object 50 that had been walking on the roadside zone z1 deviates to a roadway side (a right side) for some reason and is walking on the dividing line LL. In such a situation, it is highly likely that the surrounding sensor 11 cannot detect a dividing line LLr (that is, the dividing line LL on the farther side of the three-dimensional object 50 when seen from the own vehicle V). When a distance of a section of the dividing line LLr which has not been detected is more than or equal to the distance threshold dth, the conventional apparatus determines that no avoidance space exists because the condition 1 is not satisfied. In this case, even though an avoidance space actually exists as shown in FIG. 6 and the automatic steering control is feasible, the automatic steering control will not be performed.

Thus, when following conditions 5 to 8 and the above-mentioned conditions 3 and 4 are all satisfied, the present embodiment apparatus determines in the avoidance space determination processing that an avoidance space exists even though the condition 1 is not satisfied.

(Condition 5) One dividing line among the left and right dividing lines has been detected as a continuous line over the distance range R whereas a part of an other dividing line has not been detected.
(Condition 6) The target object is positioned on a virtual dividing line (mentioned later).
(Condition 7) The target object is moving.
(Condition 8) A moving direction of the target object is same as a target extending direction (mentioned later).

That is, the present embodiment apparatus executes two types of avoidance space determination processing based on whether or not the condition 1 is satisfied. Hereinafter, the avoidance space determination processing executed based on whether or not the conditions 1 to 4 are all satisfied will be also referred to as "first determination processing". In addition, the avoidance space determination processing executed based on whether or not the conditions 5 to 8 and the conditions 3 and 4 are all satisfied will be also referred to as "second determination processing".

It should be noted that in the example of FIG. 6, although a dividing line for dividing the roadside zone z1 is the dividing line LL alone, when a type of a roadside zone is either a stopping/parking prohibited roadside zone or a pedestrian-use roadside zone, dividing lines for dividing the roadside zone z1 are double lines. In this case, the present embodiment apparatus recognizes a dividing line on a roadway side among the double dividing lines as "one dividing line forming a travelling lane".

A specific description regarding the conditions 5 to 8 and the conditions 3 and 4 will be made below. The ECU 10 determines whether or not the condition 5 is satisfied based on the coordinate information of dividing lines. Specifically, when following two points are all satisfied, the ECU 10 determines that the condition 5 is satisfied.

One dividing line among the left and right dividing lines detected is extending without any discontinuation over the distance range R, or even though the one dividing line brakes in the middle, the interval db between breaking dividing lines or the distance R1-L1 of a section where the one dividing line has not been detected is less than the distance threshold dth.

The other dividing line among the left and right dividing lines detected breaks in the middle within the distance range R, and the interval db between breaking dividing lines or the distance R1-L1 of a section where the other dividing line has not been detected is more than or equal to the distance threshold dth.

Figure 3:
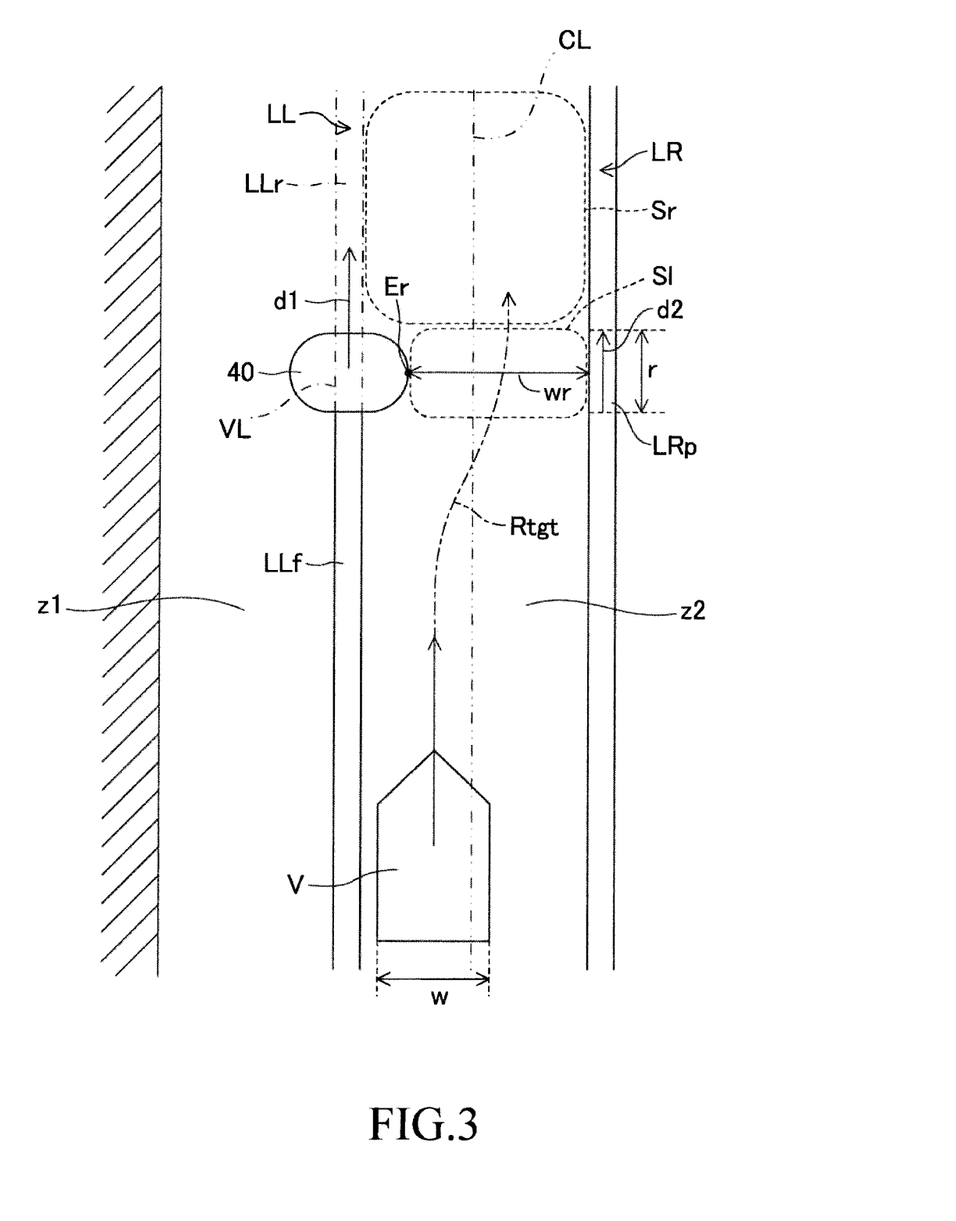
FIG. 3 is a diagram for describing on second determination processing among the avoidance space determination processing.

When having determined that the condition 5 is satisfied, the ECU 10 determines whether or not the condition 6 is satisfied based on the coordinate information of a three-dimensional object(s) and the coordinate information of the dividing lines. A specific description will be made, referring to FIG. 3. FIG. 3 shows a same situation as FIG. 6. In FIG. 3, the right dividing line LR has been detected by the surrounding sensor 11 as a continuous line, while a part of the left dividing line LL (the dividing line LLr) has not been detected. A length of the dividing line LLr is more than or equal to the distance threshold dth and thereby the condition 5 is satisfied. In this case, the ECU 10 extends/lengthen a dividing line LLf which is a detected part of the left dividing line LL toward an extending direction of the dividing line LL (refer to one dot chain line VL in FIG. 3), and determines whether or not the target object 40 is positioned on this extended line VL. When having determined that the target object 40 is positioned on the extended line VL, the ECU 10 determines that the target object 40 is positioned on the left dividing line LL (that is, the condition 6 is satisfied). Hereinafter, this extended line VL will be referred to as a "virtual dividing line VL".

When having determined that the condition 6 is satisfied, the ECU 10 determines whether or not the condition 7 is satisfied based on the coordinate information of a three-dimensional object(s). Specifically, when having determined that a positional coordinate of a target object is changing with lapse of time (chronologically), the ECU 10 determines that the condition 7 is satisfied.

When having determined that the condition 7 is satisfied, the ECU 10 determines whether or not the condition 8 is satisfied based on the coordinate information of a three-dimensional object(s) and the coordinate information of the dividing lines. Specifically, as shown in FIG. 3, the ECU 10 calculates a line positioned at an equal distance from the right dividing line LR and from the left dividing line LLf, and defines this line as a center line CK of the travelling lane z2. Thereafter, the ECU 10 calculates a positional coordinate of a part LRp of the right dividing line LR having a line-symmetric positional relationship with the target object 40 with respect to the central line CL. When it is possible to calculate a depth of the target object 40, a depth of the part LRp is set to a same value as the depth of the target object 40, and when it is impossible to calculate the depth of the target object 40, the depth of the part LRp is set to a predetermined value r (refer to FIG. 3).

Subsequently, the ECU 10 executes direction determination processing for determining whether or not a moving direction d1 of the target object 40 is same as an extending direction d2 of the part LRp. Specifically, the ECU 10 calculates the moving direction d1 of the target object 40 and the extending direction d2 of the part LRp, respectively, and determines whether or not a magnitude |θ| of an angle θ formed by the directions d1, d2 is less than or equal to a predetermined angle threshold θth. The angle threshold θth is an upper limit angle (30 degrees, for example) by which two directions can be regarded as substantially parallel with each other, and has been set in advance. Hereinafter, the extending direction d2 of the part LRp will be referred to as a "target extending direction d2".

In an example of FIG. 2, a magnitude |θ| of an angle θ formed by the direction d1 and the direction d2 is 0 degree. In this case, the ECU 10 determines that the magnitude |θ| of the angle θ is less than or equal to the angle threshold θth (|θ|≤θth), and determines that the moving direction d1 of the target object 40 is same as the target extending direction d2 (that is, the condition 8 is satisfied). When the condition 8 is satisfied, the ECU 10 determines that on the farther side of the target object 40 when seen from the own vehicle V, a dividing line (i.e., the dividing line LLr) forming a pair with the right dividing line LR is extending. In other words, the ECU 10 determines that the travelling lane z2 continuously exists in front of the own vehicle V.

On the other hand, when having determined that the magnitude |θ| of the angle θ is larger than the angle threshold θth (|θ|>θth), the ECU 10 determines that the moving direction of a target object is different from a target extending direction (that is, the condition 8 is not satisfied).

When having determined that the condition 8 is satisfied, the ECU 10 determines whether or not the condition 3 is satisfied based on the coordinate information of a three-dimensional object(s) and the coordinate information of the dividing lines. Although the specific processing is as described above, the second determination processing differs from the first determination processing in that a lateral distance (the left side distance wl in the example of FIG. 3) between the target object 40 and the "dividing line on which the target object 40 is positioned" is calculated as a 0 value. When having determined that a lateral distance (the right side distance wr in the example of FIG. 3) between the target object 40 and an "other dividing line forming a pair with the dividing line on which the target object 40 is positioned" is larger than the value w+m, the ECU 10 determines that the condition 3 is satisfied.

When having determined that the condition 3 is satisfied, the ECU 10 determines whether or not the condition 4 is satisfied based on the coordinate information of a three-dimensional object(s) and the coordinate information of the dividing lines. The specific processing is as described above. When having determined that any other three-dimensional objects do not exist in the space Sl and the space Sr (refer to FIG. 3), the ECU 10 determines that the condition 4 is satisfied.

When having determined that an avoidance space exists in the avoidance space determination processing, the ECU 10 performs the automatic steering control. Specifically, the ECU 10 determines a target point position on a segment which is passing through the edge of the target object 40 adjacent with the space Sl (the right edge Er in the example of FIG. 3) as well as is extending in the vehicle width direction. This target point is set to a position apart from the above-mentioned edge by a "value ((ws+m)/2) obtained by adding the margin m to one half of a value where the margin m is subtracted from the lateral distance ws (the right side distance wr in the example of FIG. 3)". The ECU 10 calculates, as an avoidance route, a smooth target trajectory Rtgt passing the "central position of the front edge of the own vehicle at a current timing" and the "target point position" by a well-known method (refer to Japanese Patent Application Laid-Open (kokai) No. 2018-144675).

After calculating the target trajectory Rtgt, the ECU 10 calculates a target yaw rate required for the own vehicle V to travel along the target trajectory Rtgt. The ECU 10 calculates, based on a current yaw rate and a vehicle speed, a target steered angle required to match the current yaw rate with the target yaw rate, and transmits to the ECU 20 a steering instruction indicating this target steered angle.

When having received the steering instruction, the steering ECU 20 controls the steered motor 22 in accordance with the target steered angle to steer the steered wheels. Thereby, the steered angle of the steered wheels is automatically changed (that is, the steering torque is applied to the steering mechanism 23), and the own vehicle travels in such a manner that the own vehicle avoids a collision with the target object without deviating from the travelling lane. That is, the ECU 10 performs the automatic steering control via the steering ECU 20.

In contrast, when having determined that no avoidance space exists in the avoidance space determination processing, the ECU 10 does not perform the automatic steering control but performs the automatic braking control mentioned below.

The automatic braking control is control for automatically applying braking force to the own vehicle when a target object has been detected. Specifically, the ECU 10 calculates, based on a following expression (2), a target deceleration areq required for the own vehicle to stop before the target object by a distance β. It should be noted that the deceleration is an acceleration with a negative value.

$$areq = -V^2/2(L-\beta) \quad (2)$$

v: vehicle speed
L: distance from the own vehicle to the collision expected position
β: margin distance The ECU 10 transmits to the brake ECU 30 a braking instruction including the target deceleration areq. When having received the braking instruction, the brake ECU 30 controls the brake actuator 31 in such a manner that an actual acceleration matches with the target deceleration areq to generate friction braking force at each of the wheels, and thereby decelerates the own vehicle.

(Actual Operation)

Figure 4:
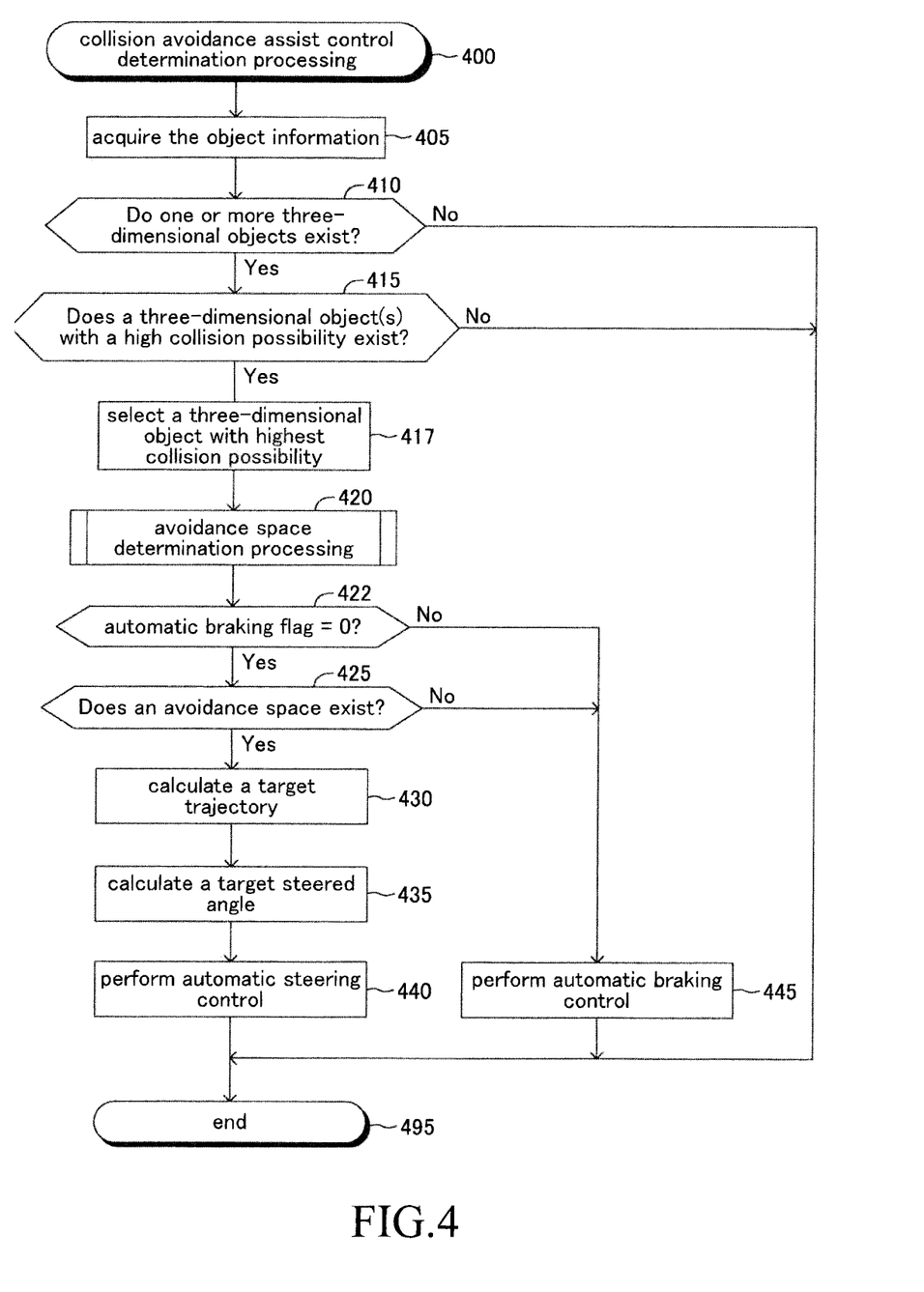
FIG. 4 is a flowchart showing a routine (collision avoidance assist control determination processing) executed by CPU of collision avoidance assist ECU of the collision avoidance assist apparatus.

The CPU of the ECU 10 is configured to execute a routine (collision avoidance assist control determination processing) shown by a flowchart in FIG. 4 every time a predetermined time elapses during a period where an ignition switch of the own vehicle has been turned on as well as neither the automatic steering control nor the automatic braking control is being performed.

When a predetermined timing arrives, the CPU initiates processing from a step 400 in FIG. 4 and proceeds to a step 405 to acquire the object information from the surrounding sensor 11. Subsequently, the CPU proceeds to a step 410 to determine, based on the object information, whether or not one or more three-dimensional objects exist in front of the own vehicle. When any three-dimensional object does not exist in front of the own vehicle, the CPU makes a "No" determination at the step 410 (that is, determines that the automatic steering control is unnecessary), and proceeds to a step 495 to tentatively terminate the present routine.

On the other hand, when one or more three-dimensional objects exist in front of the own vehicle, the CPU makes an "Yes" determination at the step 410 to proceed to a step 415. At the step 415, the CPU determines, for all the three-dimensional objects determined to exist at the step 410, whether or not a possibility that the own vehicle collides with each of the three-dimensional objects (collision possibility) is high based on the trajectory of the own vehicle, the trajectory (or the position) of each of the three-dimensional objects, and the TTC of each of the three-dimensional objects, and thereby determines whether or not a three-dimensional object(s) with a high collision possibility exists. When a three-dimensional object with the high collision possibility does not exist, the CPU makes a "No" determination at the step 415 (that is, the automatic steering control is unnecessary), and proceed to the step 495 to tentatively terminate the present routine.

In contrast, when a three-dimensional object with the high collision possibility exists, the CPU makes an "Yes" determination at the step 415 to proceed to a step 417. At the step 417, the CPU selects a three-dimensional object with a smallest TTC among the three-dimensional objects determined to have the high collision possibility at the step 415, and determines that this selected three-dimensional object is a target object. Thereafter, the CPU proceeds to a step 420. It should be noted that when only one three-dimensional object exists which has been determined to have the high collision possibility at the step 415, the CPU determines that this three-dimensional object is a target object, and directly proceeds to the step 420 without proceeding to the step 417.

Figure 5:
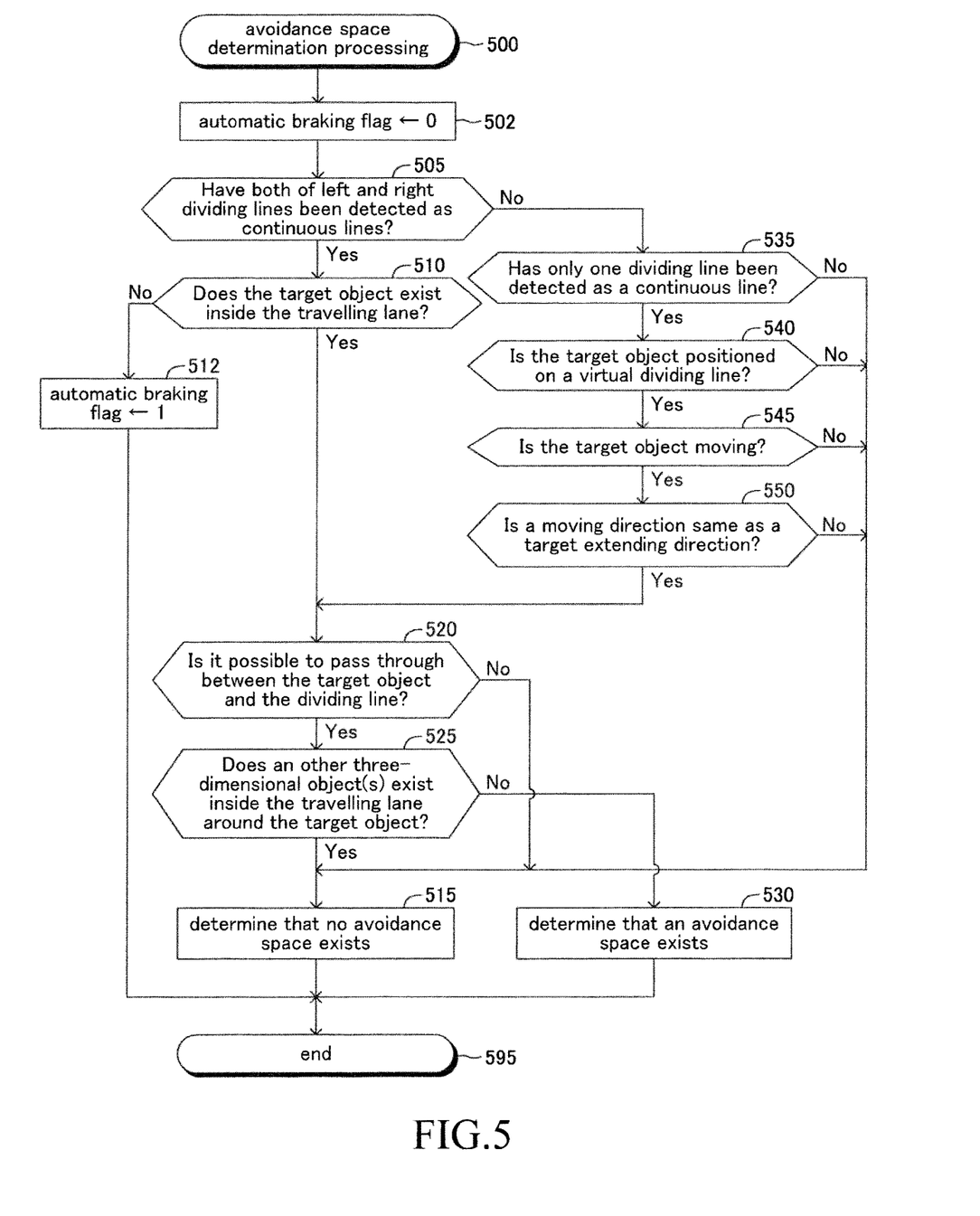
FIG. 5 is a flowchart showing a routine (avoidance space determination processing) executed by the CPU.

At the step 420, the CPU is configured to execute a routine (avoidance space determination processing) shown by a flowchart in FIG. 5. The CPU initiates processing from a step 500 in FIG. 5 and proceeds to a step 502 to set a value of an automatic braking flag to 0. The automatic braking flag is a flag to determine whether or not to perform the automatic braking control. When a value of the automatic braking flag is 1, the CPU performs the automatic braking control, and when a value of the automatic braking flag is 0, the CPU does not perform the automatic braking control (performs the automatic steering control instead).

Subsequently, the CPU proceeds to a step 505 to determine whether or not both of left and right dividing lines LL and LR defining a travelling lane have been detected as continuous lines. When both of the left and right dividing lines LL and LR have been detected as continuous lines, the CPU makes an "Yes" determination at the step 505 (that is, determines that the condition 1 is satisfied) to proceed to a step 510.

At the step 510, the CPU determines whether or not at least a part of the target object exists inside the travelling lane. When a whole part of the target object exists outside the travelling lane, the CPU makes a "No" determination at the step 510 (that is, determines that the condition 2 is not satisfied) to proceed to a step 512. At the step 512, the CPU sets a value of the automatic braking flag to 1. That is, when the whole part of the target object exists outside the travelling lane, the CPU does not determine whether or not an avoidance space exists. Thereafter, the CPU proceeds to a step 422 in FIG. 4 mentioned later via a step 595.

On the other hand, when at least a part of the target object exists inside the travelling lane, the CPU makes an "Yes" determination at the step 510 (that is, determines that the condition 2 is satisfied) to proceed to a step 520. At the step 520, the CPU determines, based on the left side distance wl and the right side distance wr, whether or not it is possible for the own vehicle to pass through between the target object and one of the left and right dividing lines LL, LR. It should be noted that when the target object exists on the left dividing line LL, the CPU calculates the left side distance wl as 0, and when the target object exists on the right dividing line LR, the CPU calculates the right side distance wr as 0.

When it is impossible for the own vehicle to pass through between the target object and one of the left and right dividing lines LL, LR (that is, when wl ≤w+m and wr≤w+m are both satisfied), the CPU makes a "No" determination at the step 520 (that is, determines that the condition 3 is not satisfied), and proceeds to a step 515 to determine that no avoidance space exists in front of the own vehicle. Thereafter, the CPU proceeds to the step 422 in FIG. 4 via the step 595.

In contrast, when it is possible for the own vehicle to pass through between the target object and one of the left and right dividing lines LL, LR (that is, when max(wl, wr)>w+m is satisfied), the CPU makes an "Yes" determination at the step 520 (that is, determines that the condition 3 is satisfied) to proceed to a step 525. At the step 525, the CPU determines whether or not an other three-dimensional object(s) exists inside the travelling lane around the target object (that is, the space Sl and the space Sr). When an other three-dimensional object(s) exists, the CPU makes an "Yes" determination at the step 525 (that is, determines that the condition 4 is not satisfied), and proceeds to the step 515 to determine that no avoidance space exists in front of the own vehicle. Thereafter, the CPU proceeds to the step 422 in FIG. 4 via the step 595.

On the other hand, when an other three-dimensional object does not exist in either the space Sl or the space Sr, the CPU makes a "No" determination at the step 525 (that is, determines that the condition 4 is satisfied), and proceeds to a step 530 to determine that an avoidance space exists in front of the own vehicle. Thereafter, the CPU proceeds to the step 422 in FIG. 4 via the step 595. The processing of the steps 505, 510, 520, and 525 correspond to the first determination processing among the avoidance space determination processing.

In contrast, when at least one of the left and right dividing lines LL and LR has not been at least partially detected, the CPU makes a "No" determination at the step 505 to proceed to a step 535. At the step 535, the CPU determines whether or not "one dividing line among the left and right dividing lines has been detected as a continuous line whereas a part of an other dividing line has not been detected". When both of the left and right dividing lines LL and LR have not been at least partially detected, the CPU makes a "No" determination at the step 535 (that is, determines that the condition 5 is not satisfied), and proceeds to the step 515 to determine that no avoidance space exists in front of the own vehicle. Thereafter, the CPU proceeds to the step 422 in FIG. 4 via the step 595.

On the other hand, when one dividing line among the left and right dividing lines has been detected as a continuous line whereas a part of an other dividing line has not been detected, the CPU makes an "Yes" determination at the step 535 (that is, determines that the condition 5 is satisfied) to proceed to a step 540. At the step 540, the CPU determines whether or not the target object is positioned on a virtual dividing line VL. When the target object is not positioned on the virtual dividing line VL (for example, when a whole part of the target object exists inside or outside the travelling lane as well as a part of the other dividing line has not been detected due to some dent on a road, the CPU makes a "No" determination at the step 540 (that is, determines that the condition 6 is not satisfied), and proceeds to the step 515 to determine that no avoidance space exists in front of the own vehicle. Thereafter, the CPU proceeds to the step 422 in FIG. 4 via the step 595.

In contrast, when the target object is positioned on the virtual dividing line VL, the CPU makes an "Yes" determination at the step 540 (that is, determines that the condition 6 is satisfied) to proceed to a step 545. At the step 545, the CPU determines whether or not the target object is moving. When the target object is stationary, the CPU makes a "No" determination at the step 545 (that is, determines that the condition 7 is not satisfied), and proceeds to the step 515 to determine that no avoidance space exists in front of the own vehicle. Thereafter, the CPU proceeds to the step 422 in FIG. 4 via the step 595.

On the other hand, when the target object is moving, the CPU makes an "Yes" determination at the step 545 (that is, determines that the condition 7 is satisfied) to proceed to a step 550. At the step 550, the CPU determines, based on a magnitude $|\theta|$ of an angle $\theta$ formed by a moving direction d1 of the target object and a target extending direction d2, whether or not the moving direction d1 of the target object is same as the target extending direction d2 (that is, executes direction determination processing). When the moving direction d1 differs from the target extending direction d2 (that is, when $|\theta|>\theta th$ is satisfied, and for example, when the target object is moving in a direction intersecting with a dividing line), the CPU makes a "No" determination at the step 550 (that is, determines that the condition 8 is not satisfied), and proceeds to the step 515 to determine that no avoidance space exists in front of the own vehicle. Thereafter, the CPU proceeds to the step 422 in FIG. 4 via the step 595.

In contrast, when the moving direction d1 is the same as the target extending direction d2 (that is, when $|\theta|\leq\theta th$ is satisfied), the CPU makes an "Yes" determination at the step 550 (that is, determines that the condition 8 is satisfied), and executes the processing after the step 520 as described above.

At the step 422 in FIG. 4, the CPU determines whether or not a value of the automatic braking flag is 0. When a value of the automatic braking flag is 1, the CPU makes a "No" determination at the step 422 to proceed to a step 445. At the step 445, the CPU calculates a target deceleration. The CPU then transmits the braking instruction indicating the target deceleration to the brake ECU 30 and performs the automatic braking control via the brake ECU 30. Thereafter, the CPU proceeds to the step 495 to tentatively terminate the present routine.

On the other hand, when a value of the automatic braking flag is 0, the CPU makes an "Yes" determination at the step 422 to proceed to a step 425. At the step 425, the CPU determines, based on the determination result at the step 420, whether or not an avoidance space exists. When an avoidance space exists, the CPU makes an "Yes" determination at the step 425 (that is, determines that the automatic steering control is feasible) to proceed to a step 430. At the step 430, the CPU executes processing of a step 430 to a step 440 described below in this order, and proceeds to the step 495 to tentatively terminate the present routine.

Step 430: The CPU determines (calculates) a target trajectory Rtgt by the method described above.

Step 435: The CPU calculates a target steered angle required for the own vehicle to travel along the target trajectory Rtgt.

Step 440: The CPU transmits to the steering ECU 20 the steering instruction including the target steered angle, and performs the automatic steering control via the steering ECU 20.

On the other hand, when no avoidance space exists, the CPU makes a "No" determination at the step 425 (that is, determines that the automatic steering control is not feasible), and executes the processing after the step 445 as described above.

As described above, the present embodiment apparatus is configured to be capable of performing the second determination processing in addition to the first determination processing in the avoidance space determination processing. Therefore, even when one of the left and right dividing lines LL and LR has not been partially detected, by executing the second determination processing (especially, the direction determination processing), it becomes possible to properly determine whether or not the travelling lane continuously exists in front of the own vehicle. Accordingly, a situation where the automatic steering control is not performed in spite of the control being actually feasible becomes less likely to occur. Therefore, the automatic steering control can be properly performed.

Besides, the present embodiment apparatus determines whether or not a target object is positioned on the other dividing line (that is, a dividing line, a part thereof having not been detected) based on whether or not the target object is positioned on the virtual dividing line VL. Therefore, it becomes possible to properly determine whether or not the target object is positioned on the other dividing line.

Further, the present embodiment apparatus calculates, as a target extending direction, an extending direction of a part of one dividing line having a line-symmetric positional relationship with a target object with respect to the center line CL of the travelling lane, and executes the direction determination processing using this target extending direction. Therefore, it becomes possible to determine, with high accuracy, whether of not the other dividing line forming a pair with the one dividing line is extending on the farther side of the target object with respect to the own vehicle. That is, it becomes possible to more properly determine whether or not the travelling lane continuously exists in front of the own vehicle.

Further, the present embodiment apparatus determines whether or not the moving direction d1 of a target object is the same as the target extending direction d2 based on whether or not the magnitude $|\theta|$ of the angle $\theta$ formed by the moving direction d1 and the target extending direction d2 is less than or equal to the angle threshold $\theta th$. Therefore, it becomes possible to properly determine whether or not the moving direction d1 of the target object is the same as the target extending direction d2.

Further, even though a dividing line detected breaks in the middle within the distance range R, when an interval db of breaking dividing lines or a distance R1-L1 of a section where no dividing line has been detected is less than the distance threshold dth, the present embodiment apparatus interpolates the interval db or the distance R1-L1 and thereby determines that the dividing line has been detected as a continuous line. Especially, since the present embodiment apparatus sets the distance threshold dth to a value slightly larger than a general interval d of a dashed-dividing line (dth>d), when the dashed-dividing line is extending over the distance range R, the present embodiment apparatus determines that the dividing line has been detected as a continuous line. Hence, it becomes possible to perform the automatic steering control even under a situation where the control used not to be performed because a dividing line (including a dashed-dividing line) has not partially detected. As a result, a possibility that the automatic steering control is not performed in spite of being feasible can be further reduced.

Further, when the automatic steering control is not performed because no avoidance space exists in a case where a target object has been detected, the present embodiment apparatus performs the automatic braking control instead. Therefore, it becomes possible to properly avoid or mitigate a collision with the target object.

The collision avoidance assist control according to the present embodiment has been described. However, the present invention is not limited thereto and may adopt various modifications within a scope of the present invention.

For example, the automatic steering control may be performed only when a travelling lane is straight. To be more specific, the present embodiment apparatus may determine, in the avoidance space determination processing, whether or not a curvature of a travelling lane is less than or equal to a predetermined curvature threshold (an upper limit value of a curvature under which a shape of a lane can be regarded as straight) before executing the processing of the step 505. The CPU may execute the processing after the step 505 when the curvature is less than or equal to the curvature threshold, and may directly proceed to the step 512 when the curvature is larger than the curvature threshold.

In addition, the automatic steering control may be performed also when a whole part of a target object is positioned outside a travelling lane.

The invention claimed is:

1. A collision avoidance assist apparatus comprising:
an object information acquiring apparatus for acquiring, as object information, information on a three-dimensional object existing in front of an own vehicle as well as left and right dividing lines defining a travelling lane extending in front of said own vehicle;
a steered angle actuator configured to be capable of changing a steered angle of said own vehicle; and
a control unit configured to acquire, based on said object information, a collision index value indicating a collision possibility of said own vehicle and said three-dimensional object, and when said collision index value satisfies a collision condition which is satisfied when said collision possibility is high, to identify said three-dimensional object as a target object,
wherein,
said control unit is configured to:
determine, based on said object information, whether or not a first condition is satisfied, said first condition being satisfied when both of said left and right dividing lines of said travelling lane have been detected without any discontinuation in a predetermined region in front of said own vehicle,
when it is determined that said first condition is not satisfied and one dividing line of said left and right dividing lines has been detected without any discontinuation in said predetermined region as well as a part of an other dividing line has not been detected in said predetermined region, determine, based on said object information, whether or not a second condition is satisfied, said second condition being satisfied when said target object is positioned on said other dividing line as well as said target object is moving in a direction same as an extending direction of said one dividing line,
determine, based on said object information, whether or not an avoidance route for said own vehicle exists, said avoidance route enabling said own vehicle to avoid a collision with said target object without said own vehicle deviating from said travelling lane,
determine whether or not a steering avoidance condition is satisfied, said steering avoidance condition including a condition that either said first condition or said second condition is satisfied as well as said avoidance route exists, and
when it is determined that said steering avoidance condition is satisfied, perform automatic steering control for controlling said steered angle actuator in such a manner that said own vehicle travels along said avoidance route.

2. The collision avoidance assist apparatus according to claim 1, wherein,
said control unit is configured to, when a magnitude of an angle is less than or equal to a predetermined angle threshold, said angle being formed by a moving direction of said target object and said extending direction of said one dividing line, determine that said target object is moving in a same direction as said extending direction of said one dividing line.

3. The collision avoidance assist apparatus according to claim 1, wherein,
said control unit is configured to, when a distance of a part where said dividing line has not been detected is more than or equal to a predetermined distance threshold, determine that said part of said dividing line has not been detected.

* * * * *